United States Patent
Miyasaka (10) Patent No.: US 7,648,246 B2
(45) Date of Patent: Jan. 19, 2010

(54) PROJECTOR AND EXPOSURE ADJUSTMENT METHOD

(75) Inventor: Noriaki Miyasaka, Okaya (JP)

(73) Assignee: Seiko Epson Corporation, Tokyo (JP)

(*) Notice: Subject to any disclaimer, the term of this patent is extended or adjusted under 35 U.S.C. 154(b) by 742 days.

(21) Appl. No.: 11/345,389

(22) Filed: Feb. 2, 2006

(65) Prior Publication Data

US 2006/0176377 A1 Aug. 10, 2006

(30) Foreign Application Priority Data

Feb. 4, 2005 (JP) ............................. 2005-028436

(51) Int. Cl.
G03B 21/14 (2006.01)
G03B 17/00 (2006.01)
G03B 7/00 (2006.01)
G03B 7/12 (2006.01)
G03B 21/00 (2006.01)
G03B 29/00 (2006.01)
H04N 5/235 (2006.01)
H04N 5/238 (2006.01)

(52) U.S. Cl. ............................. 353/69; 353/70; 396/50; 396/213; 396/429; 396/430; 348/362; 348/363; 348/364; 348/365; 348/366

(58) Field of Classification Search ............. 353/69–70; 396/50, 213, 227, 233–234, 236, 362, 429–430; 348/231.3, 231.9, 362–366; 345/589–590, 345/618

See application file for complete search history.

(56) References Cited

U.S. PATENT DOCUMENTS

| | | | | |
|---|---|---|---|---|
| 5,596,387 A * | 1/1997 | Takagi | ......................... | 396/50 |
| 5,834,749 A * | 11/1998 | Durbin | ....................... | 235/454 |
| 6,416,186 B1 * | 7/2002 | Nakamura | ................... | 353/69 |
| 6,520,647 B2 * | 2/2003 | Raskar | ....................... | 353/70 |
| 6,788,828 B2 * | 9/2004 | Katayama et al. | .......... | 382/284 |
| 6,806,903 B1 * | 10/2004 | Okisu et al. | ................. | 348/254 |
| 7,175,285 B2 * | 2/2007 | Li et al. | ....................... | 353/70 |
| 7,204,596 B2 * | 4/2007 | Tamura | ...................... | 353/70 |
| 7,237,907 B2 * | 7/2007 | Li et al. | ....................... | 353/70 |
| 7,347,564 B2 * | 3/2008 | Matsumoto et al. | .......... | 353/69 |
| 7,446,810 B2 * | 11/2008 | Ono | ........................... | 348/345 |

(Continued)

FOREIGN PATENT DOCUMENTS

JP A 2004-312690 11/2004

Primary Examiner—Diane I Lee
Assistant Examiner—Jori S Byrne-Diakun
(74) Attorney, Agent, or Firm—Oliff & Berridge, PLC (57) ABSTRACT

A projector includes: an imaging structure that photographs an image projected on a projection object to take a photographed image; an imaging control module that performs exposure adjustment in the imaging structure to attain a preset target exposure; a control module that sets the target exposure in the imaging ctrl module; an angle information acquisition module that obtains angle information representing an inclination of the projector to the projection object; and a storage unit that stores a map representing a variation in target exposure against the angle information. The control module controls the angle information acquisition module to obtain the angle information, refers to the map stored in the storage unit to specify a target exposure corresponding to the obtained angle information, and sets the specified target exposure in the imaging control module. Even in the state of elevation projection, this arrangement of the invention enables distinct identification of a maximum brightness position in the photographed image.

3 Claims, 6 Drawing Sheets

U.S. PATENT DOCUMENTS

| | | | |
|---|---|---|---|
| 7,524,070 B2 * | 4/2009 | Matsuda et al. | 353/70 |
| 2004/0201825 A1 * | 10/2004 | Kobayashi et al. | 353/70 |
| 2005/0052620 A1 * | 3/2005 | Tamura | 353/69 |
| 2005/0237492 A1 * | 10/2005 | Shinozaki | 353/69 |
| 2006/0038962 A1 * | 2/2006 | Matsumoto et al. | 353/69 |
| 2006/0152682 A1 * | 7/2006 | Matsuda et al. | 353/40 |
| 2008/0204670 A1 * | 8/2008 | Furui | 353/69 |

* cited by examiner

(Target Exposure Setting Table)

| Elevation Angle Level (degrees) | Target Exposure |
|---|---|
| 0 | 50 |
| 5 | 55 |
| 10 | 60 |
| 15 | 65 |
| 20 | 70 |
| 25 | 75 |
| 30 | 80 |

Fig.5
Related Art (Elevation Angle θ = 0°)

PROJECTOR AND EXPOSURE ADJUSTMENT METHOD

BACKGROUND OF THE INVENTION

1. Field of the Invention

The present invention relates to a projector that projects an image on a screen or another projection object and photographs the projected image. More specifically the invention pertains to a technique of accurately identifying the position of maximum brightness in the photographed image even in an inclined attitude of the projector to the projection object.

2. Description of the Related Art

Various projectors have been proposed to photograph a projected image on a screen or another projection object with, for example, a CCD (Charge Coupled Device) camera and to adjust the zoom and the focus and correct a trapezoidal distortion of the projected image (keystone correction) based on the photographed image.

One of such projectors is disclosed in Japanese Patent Laid-Open Gazette No. 2004-312690. This prior art projector analyzes a photographed image, identifies the position of maximum brightness in the photographed image, and makes keystone correction according to the identified position of maximum brightness.

In the state of elevation projection of the projector that makes keystone correction based on the identified position of maximum brightness, that is, in an inclined attitude of the projector to the projection object, the following problems arise due to the reflection of projection light from the projection object. In the following description, the luminance value is used as an index of brightness.

Figure 5:
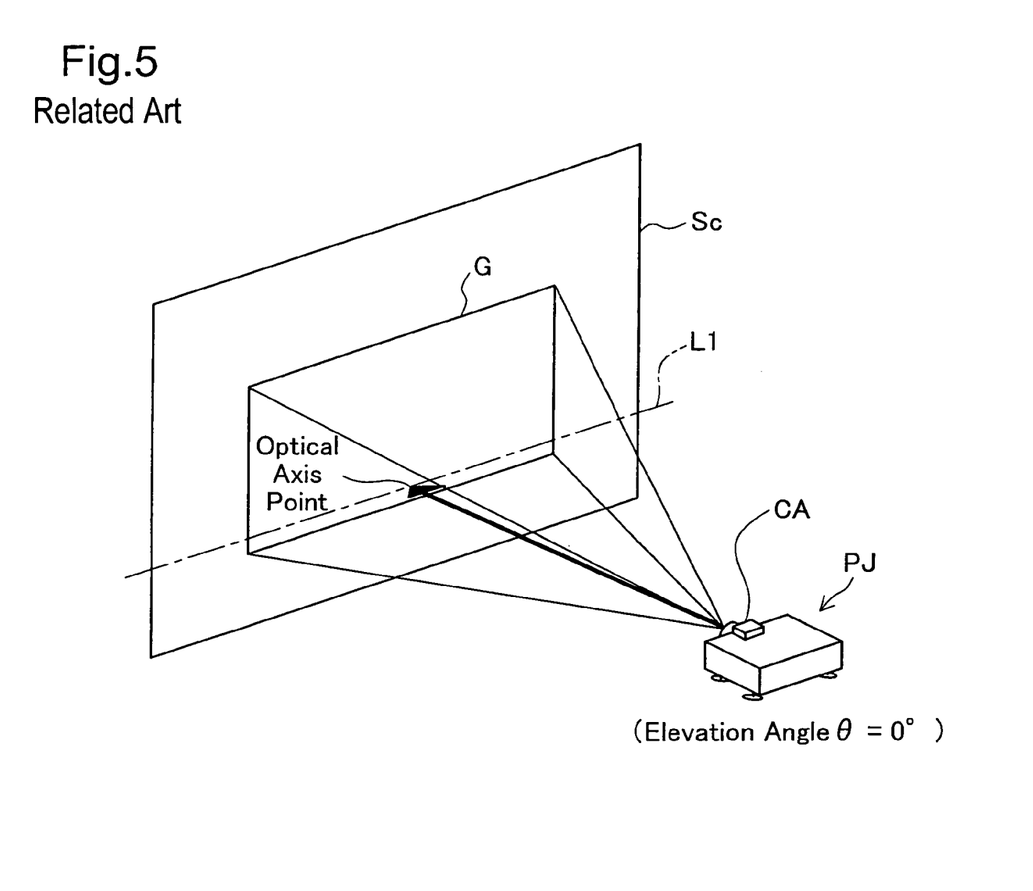
FIG. 5 is a perspective view showing a non-elevation projection state of a conventional projector.

FIG. 5 is a perspective view showing a non-elevation projection state of a conventional projector.

A projector PJ shown in FIG. 5 projects an all-white image as an adjustment pattern image G for keystone correction on a screen Sc or a projection object and photographs the adjustment pattern image G projected on the screen Sc. The projector PJ identifies the position of maximum luminance in the photographed image and makes keystone correction.

The projector PJ is located below the screen Sc not to block the user's view. The projection optical system in the projector PJ has a lens shift to prevent a trapezoidal distortion of a projected image even in the state of projection from this lower location. The intersection between the screen Sc and the optical axis of the optical system in the projector PJ shown by the thick arrow (hereafter this intersection is called 'optical axis point') is deviated downward from the center of the projected adjustment pattern image G.

In the non-elevation projection state of FIG. 5, an elevation angle is equal to 0 degree. The elevation angle represents an angle in the vertical direction between the normal of the screen Sc and the optical axis of the optical system in the projector PJ.

The projector PJ has an imaging unit CA located in the vicinity of its projection optical system (not shown). The imaging unit CA includes a CCD camera and takes an image of the screen Sc including the area of the projected adjustment pattern image G and generates RGB image data of the respective pixels included in the photographed image.

The projector PJ has an automatic exposure adjustment function. A target average luminance of all pixels included in image data of a photographed image is set as a target exposure in the projector PJ. The automatic exposure adjustment function of the projector PJ calculates an average luminance of all the pixels based on the image data of the photographed image taken with the imaging unit CA and adjusts at least one of the shutter speed, the gain, and the aperture in the imaging unit CA to make the calculated average luminance approach to the target exposure or the target average luminance.

The luminance varies in a range of 0 to 255, and the target exposure set in the projector PJ is equal to '50' in the state of FIG. 5.

Figure 6A:
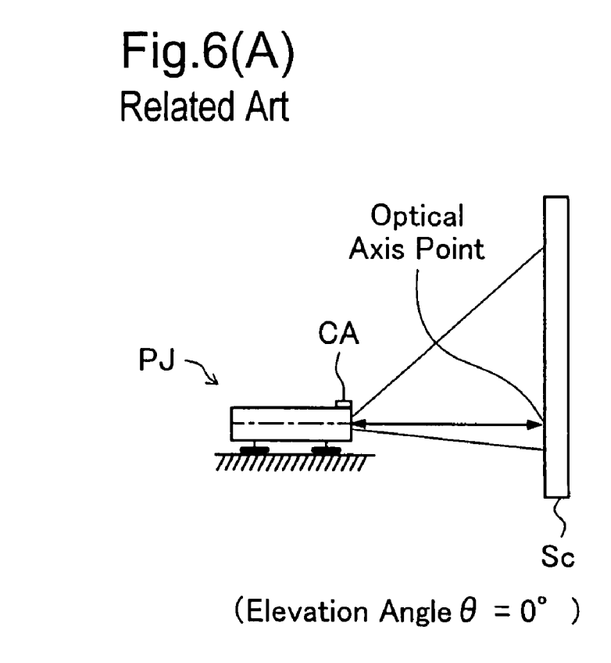
FIGS. 6(A) and 6(B) show the non-elevation projection state of the conventional projector and a luminance distribution of an image photographed in the non-elevation projection state.
Figure 6B:
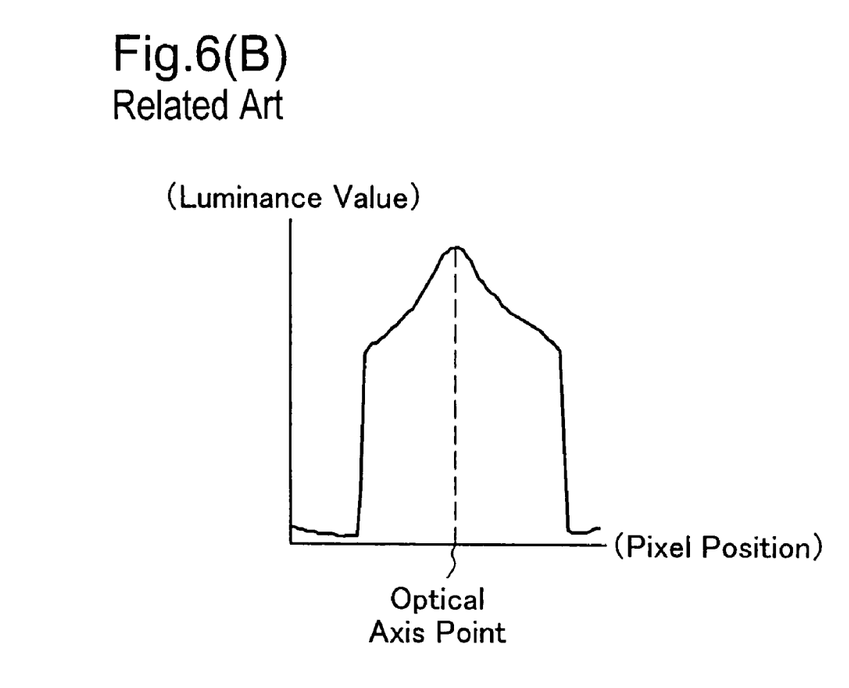

FIGS. 6(A) and 6(B) show the non-elevation projection state of the conventional projector and a luminance distribution of an image photographed in the non-elevation projection state.

FIG. 6(A) is a side view showing the non-elevation projection state of FIG. 5. The graph of FIG. 6(B) shows a distribution of luminance values of respective pixels on a horizontal line L1 including the optical axis point of FIG. 5 in the image photographed in the non-elevation projection state of FIG. 6(A). The abscissa and the ordinate of FIG. 6(B) respectively denote the pixel position in the horizontal direction and the luminance value.

As shown in the graph of FIG. 6(B), the luminance distribution has a steep peak at the position of the optical axis point. The shorter distance between the screen Sc and the projector PJ in the coverage of the projection light of the projector PJ causes the higher luminance in the photographed image. Since the projector PJ has no inclination in the horizontal direction in the state of FIG. 6(A), the luminance distribution has a peak at the position of the optical axis point. The specular reflection of the projection light from the screen Sc goes toward the projector PJ. The luminance value thus abruptly increases at the position of the optical axis point and gives a steeper peak in the luminance distribution.

Figure 7A:
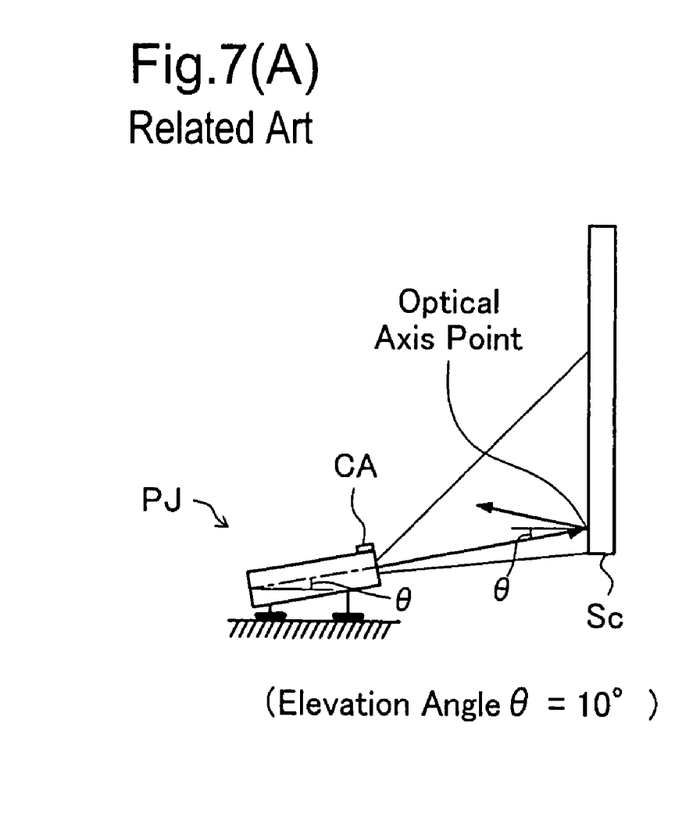
FIGS. 7(A) and 7(B) show an elevation projection state of the conventional projector and a luminance distribution of an image photographed in the elevation projection state.
Figure 7B:
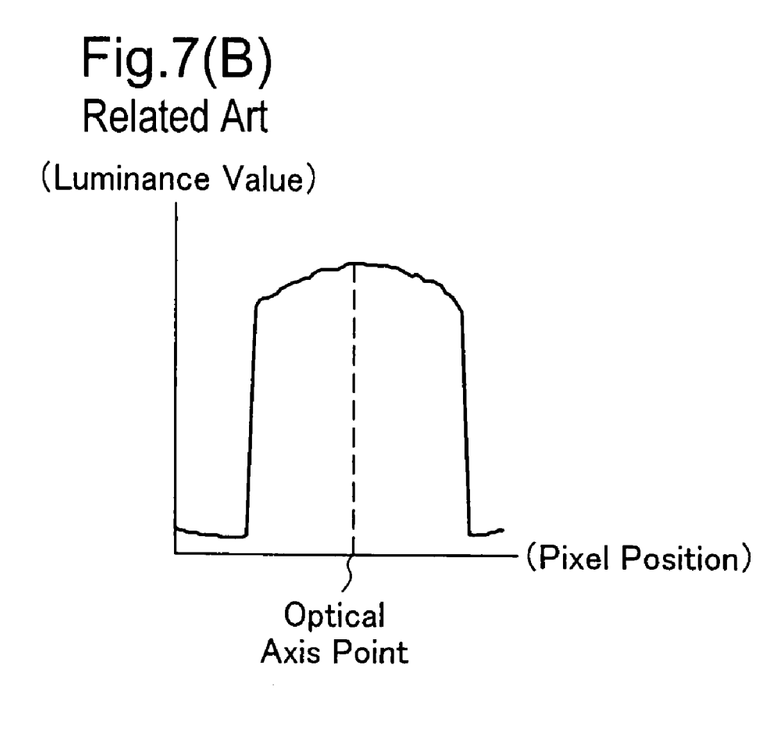

FIGS. 7(A) and 7(B) show an elevation projection state of the conventional projector and a luminance distribution of an image photographed in the elevation projection state.

FIG. 7(A) is a side view showing the elevation projection state of the projector. The graph of FIG. 7(B) shows a distribution of luminance values of respective pixels on a horizontal line including the optical axis point in the image photographed in the elevation projection state of FIG. 7(A). The abscissa and the ordinate of FIG. 7(B) are identical with those of FIG. 6(B) and are not specifically mentioned here.

As mentioned above, the projection optical system of the projector PJ has a lens shift. On some occasions, even when the projection lens is shifted to the allowable limit of the lens shift, the projector PJ may still block the user's view. In such cases, the projector PJ is located further below the screen Sc and is inclined at an elevated angle to the screen Sc as shown in FIG. 7(A). The projector PJ is located at an elevation angle of 10 degrees in the state of FIG. 7(A).

As in the state of FIG. 6, the target exposure set in the projector PJ is equal to '50' in the state of FIG. 7.

As shown in the graph of FIG. 7(B), the luminance distribution has a peak at the position of the optical axis point. Unlike the luminance distribution of FIG. 6(B), however, the luminance distribution of FIG. 7(B) has a gentler peak and an indistinct peak position.

As mentioned previously, the shorter distance between the screen Sc and the projector PJ in the coverage of the projection light of the projector PJ causes the higher luminance in the photographed image. The luminance distribution of FIG. 7(B) accordingly has a peak at the position of the optical axis point as in the luminance distribution of FIG. 6(B). In the state of elevation projection, the specular reflection of the projection light, which irradiates the optical axis point, from the screen Sc goes farther from the projector PJ as shown by the thick arrow in FIG. 7(A). The peak luminance in the state of elevation projection is accordingly lower than the peak luminance in the state of non-elevation projection. This causes smaller differences in luminance between the maximum luminance position and peripheral lower luminance positions and gives a gentler peak in the luminance distribution.

The larger elevation angle causes the specular reflection of the projection light irradiating the optical axis point to go father from the projector PJ. The luminance distribution accordingly has a gentler peak and a more indistinct peak position.

In the state of elevation projection, the conventional technique may give only an indistinct peak position or maximum luminance position and fail to accurately identify the peak position in the photographed image. The inaccurate identification of the peak position may result in inadequate and inaccurate keystone correction.

SUMMARY OF THE INVENTION

The object of the invention is thus to eliminate the drawbacks of the prior art technique in a projector that projects an image on a screen or another projection object and photographs the projected image and to provide a technique of accurately identifying the position of maximum brightness in a photographed image even in an inclined attitude of the projector to the projection object.

In order to attain at least part of the above and the other related objects, the present invention is directed to a projector that projects an image on a projection object. The projector includes: an imaging structure that photographs the image projected on the projection object to take a photographed image; an imaging control module that performs exposure adjustment in the imaging structure to attain a preset target exposure; a control module that sets the target exposure in the imaging control module; an angle information acquisition module that obtains angle information representing an inclination of the projector to the projection object; and a storage unit that stores a map representing a variation in target exposure against the angle information. The control module controls the angle information acquisition module to obtain the angle information, refers to the map stored in the storage unit to specify the target exposure corresponding to the obtained angle information, and sets the specified target exposure in the imaging control module.

In the projector of the invention, the map of the target exposure to the angle information is stored in the storage unit. The control module refers to the map to specify the target exposure corresponding to the angle information obtained by the angle information acquisition module and sets the specified target exposure in the imaging control module. The imaging control module performs exposure adjustment in the imaging structure to attain the specified target exposure. Setting the optimum target exposure corresponding to each piece of angle information in the storage unit ensures adequate exposure adjustment in the imaging structure to attain the optimum target exposure even in an inclined attitude of the projector to the projection object.

In the projector of the invention, it is preferable that the map stored in the storage unit sets a greater target exposure corresponding to a piece of the angle information representing a greater inclination.

In a significantly inclined attitude of the projector to have a large gradient to the projection object, the photographed image taken by the imaging structure has a lower brightness peak. The lower brightness peak causes smaller differences in brightness between a maximum brightness position and peripheral lower brightness positions. The above preferable setting maps the greater target exposure to the piece of the angle information representing the greater inclination. The exposure adjustment in the imaging structure is performed to attain the greater target exposure in the significantly inclined attitude of the projector to the projection object. The comprehensive increase in brightness of the photographed image effectively prevents the smaller differences in brightness between the maximum brightness position and the peripheral lower brightness positions.

In one preferable embodiment of the invention, the projector further includes: an analyzer module that analyzes the photographed image taken by the imaging structure and obtains positional information representing a peak position or a maximum brightness position in the photographed image; and an image processing module that adjusts the projected image, based on the positional information obtained by the analyzer module.

Even in an inclined attitude of the projector to the projection object, the technique of the invention prevents the smaller differences in brightness between the maximum brightness position and the lower brightness positions in the photographed image. The peak position or maximum brightness position is thus accurately identifiable in the photographed image. The structure of this preferable embodiment ensures adequate and accurate adjustment of the projected image based on the positional information representing the accurately identified peak position even in the inclined attitude of the projector to the projection object.

In the projector of the preferable embodiment, the image processing module may adjust the projected image to correct a distortion of the projected image caused by the inclination of the projector to the projection object.

Even in the inclined attitude of the projector to the projection object, the image adjustment based on the accurately identified peak position adequately corrects a distortion of the projected image caused by the inclination of the projector. A correction value for correcting a distortion of the projected image may be determined corresponding to the peak position. This arrangement enables the distortion of the projected image to be corrected with the adequate correction value determined corresponding to the accurately identified peak position. The projected image is thus adjustable to have significantly little distortion.

The technique of the invention is not restricted to the projector having any of the above arrangements but is also actualized by a corresponding exposure adjustment method.

DESCRIPTION OF THE PREFERRED EMBODIMENTS

One mode of carrying out the invention is described below as a preferred embodiment in the following sequence:

A. Embodiment
  A1. General Configuration of Projector
  A2. Outline of Image Projection Operations
  A3. Maximum Luminance Position Identification Process and Keystone Correction Process
  A4. Effects of Embodiment
B. Modifications

A. Embodiment

A1. General Configuration of Projector

Figure 1:
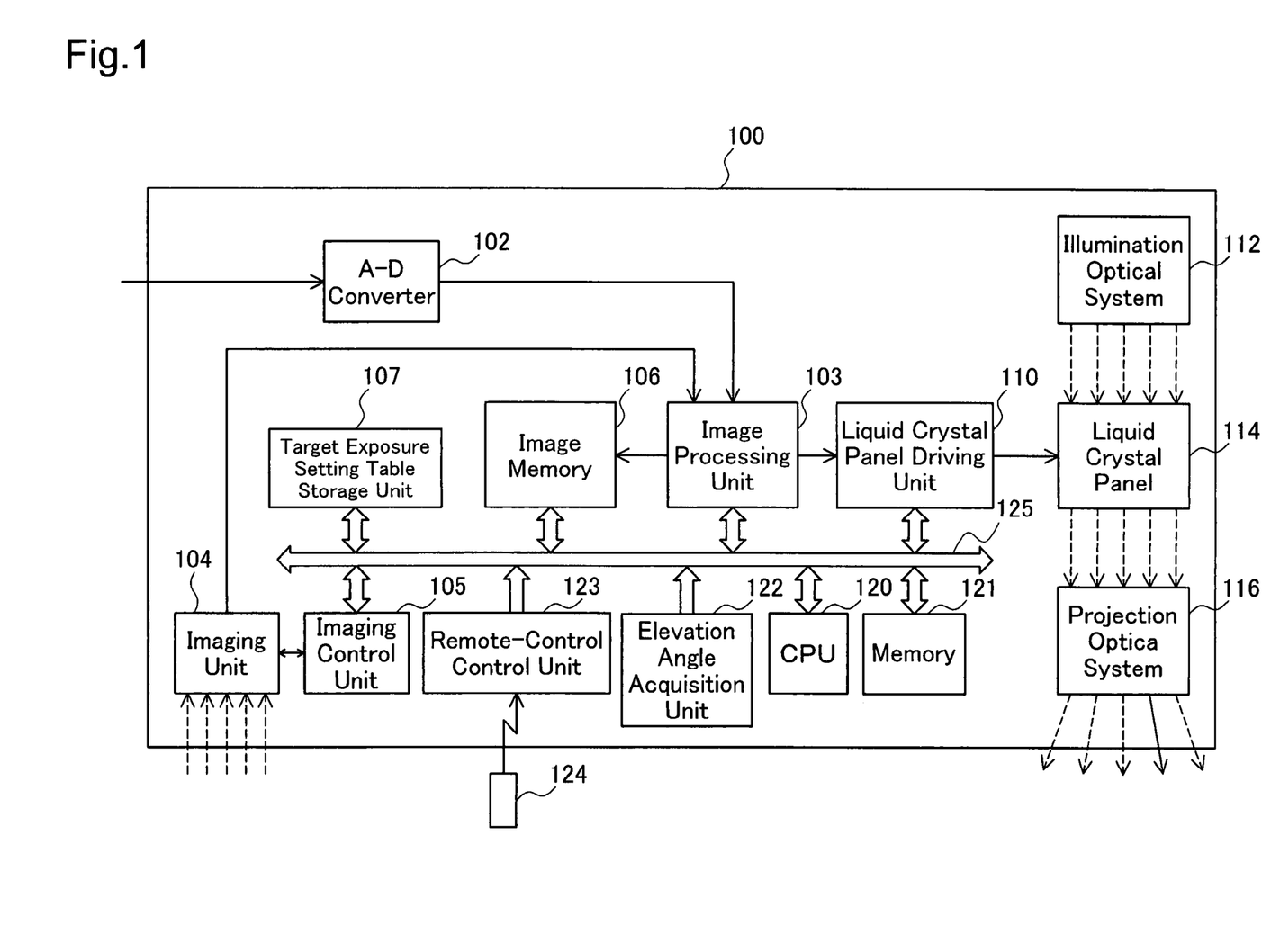
FIG. 1 schematically illustrates the configuration of a projector in one embodiment of the invention.

FIG. 1 schematically illustrates the configuration of a projector 100 in one embodiment of the invention. The projector 100 of this embodiment has the functions of photographing a projected image on a screen, identifying the position of maximum luminance in the photographed image, and making keystone correction, like the conventional projector PJ shown in FIGS. 5 through 7.

As illustrated, the projector 100 includes an A-D converter 102, an image processing unit 103, an imaging unit 104, an imaging control unit 105, an image memory 106, a target exposure setting table storage unit 107, a liquid crystal panel driving unit 110, a CPU 120, a memory 121, an elevation angle acquisition unit 122, a remote-control control unit 123, and a remote control 124.

The projector 100 also has optical elements, that is, an illumination optical system 112 including a lamp and a reflector (not shown), a liquid crystal panel 114, and a projection optical system 116 including a projection lens.

The CPU 120 is connected via an internal bus 125 to the image processing unit 103, the imaging control unit 105, the image memory 106, the target exposure setting table storage unit 107, the liquid crystal panel driving unit 110, the memory 121, the elevation angle acquisition unit 122, and the remote-control control unit 123.

The imaging unit 104 has a CCD camera and is positioned near to the projection optical system 116 as in the arrangement of the conventional projector PJ shown in FIG. 5. The imaging unit 104 photographs an image of a preset fixed area. The imaging control unit 105 controls at least one of the shutter speed, the gain, and the aperture set in the imaging unit 104 to adjust the exposure in image taking.

The elevation angle acquisition unit 122 includes an acceleration sensor that detects an inclination of the projector 100. The elevation angle acquisition unit 122 obtains the elevation angle computed from the detected inclination.

The target exposure setting table storage unit 107 stores a target exposure setting table before shipment of the projector 100.

The CPU 120 of the embodiment corresponds to the control module and the analyzer module of the invention. The elevation angle acquisition unit 122 corresponds to the angle information acquisition module of the invention.

A2. Outline of Image Projection Operations

The standard operations of image projection in the projector 100 are described briefly with reference to FIG. 1.

In response to the user's operation of the remote control 124 to enter an image projection start command, the remote control 124 transfers the user's image projection start command to the remote-control control unit 123 by wireless communication. The remote-control control unit 123 transmits the image projection start command transferred from the remote control 124 to the CPU 120 via the internal bus 125. The CPU 120 controls the image processing unit 103 and the other relevant elements in response to the transmitted image projection start command to project an image.

The A-D converter 102 inputs analog video signals output from any of a video player, a TV set, a DVD player, and a personal computer, converts the input analog video signals into digital video signals, and outputs the digital video signals to the image processing unit 103. One modified structure may exclude the A-D converter 102 and may directly enter digital video signals into the image processing unit 103. The image processing unit 103 adjusts the input digital video signals to desired image display conditions, for example, the contrast, the sharpness, and the image shape, and outputs the adjusted digital video signals to the liquid crystal panel driving unit 110.

The liquid crystal panel driving unit 110 drives the liquid crystal panel 114 in response to the input digital video signals. The liquid crystal panel 114 modulates the illumination light emitted from the illumination optical system 112 according to image information. The projection optical system 116 is attached to a front face of the casing of the projector 100 and projects the illumination light modulated by the liquid crystal panel 114 onto a screen (not shown). This projects an image on the screen.

The projection optical system 116 has the lens shift as in the projection optical system of the conventional projector PJ. The projection state of the projector 100 under the non-elevating condition is identical with the projection state of the conventional projector PJ shown in FIG. 5.

A3. Maximum Luminance Position Identification Process and Keystone Correction Process When the user positions the projector 100 to have an elevation angle of 10 degrees relative to the screen as shown in FIG. 7(A) and powers on the projector 100, the projector 100 projects an adjustment pattern image on the screen.

The image processing unit 103 (see FIG. 1) generates an all-white image as the adjustment pattern image. The all-white image is projected on the screen according to the image projection operations described above.

The user manipulates the remote control 124 (see FIG. 1) to enter a keystone correction start command. The keystone correction start command is transmitted to the CPU 120 via the remote-control control unit 123 and the internal bus 125 in the same manner as the image projection start command described above. The CPU 120 reads a program of the maximum luminance position identification process from the memory 121 and executes this program prior to the keystone correction. Execution of this program starts the maximum luminance position identification process, which is characteristic of the invention.

Figure 2:
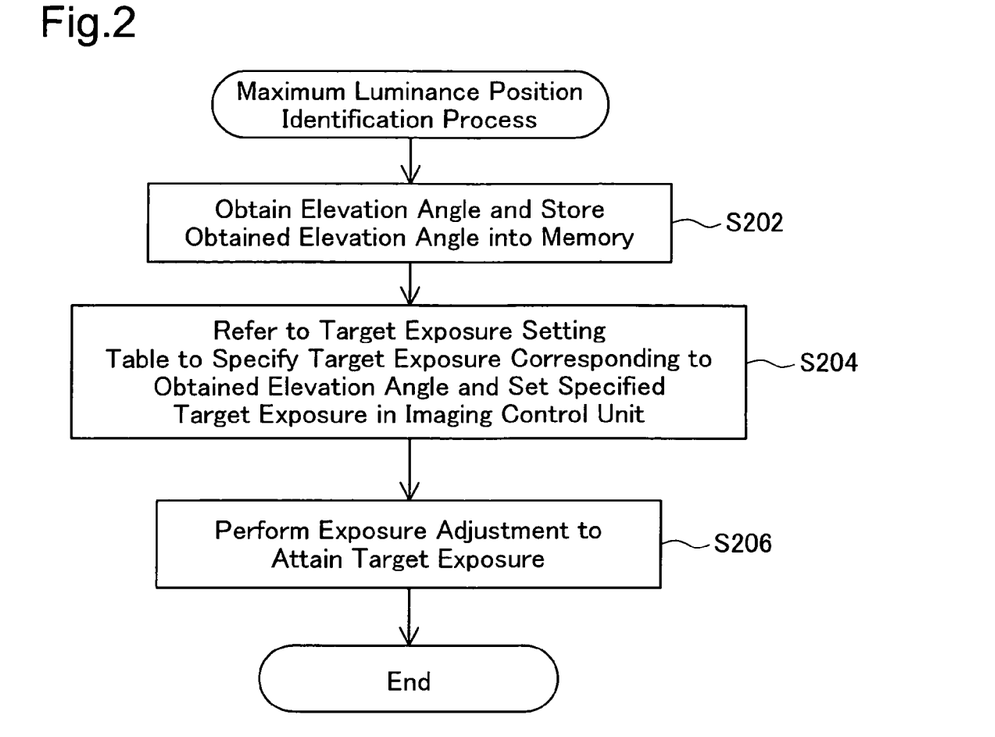
FIG. 2 is a flowchart showing a maximum luminance position identification process executed by a CPU included in the projector of the embodiment.

FIG. 2 is a flowchart showing the maximum luminance position identification process executed in the projector 100 of the embodiment.

In the maximum luminance position identification process of FIG. 2, the CPU 120 first controls the elevation angle acquisition unit 122 to obtain the elevation angle and stores the obtained elevation angle into the memory 121 (step S202). When the projector 100 is positioned to have an elevation angle of 10 degrees, the elevation angle acquisition unit 122 obtains the elevation angle of 10 degrees and stores the elevation angle of 10 degrees into the memory 121.

The CPU 120 refers to the target exposure setting table stored in the target exposure setting table storage unit 107, specifies a target exposure corresponding to an elevation angle level closest to the elevation angle obtained by the elevation angle acquisition unit 122 and read from the memory 121, sets the specified target exposure as a target value of exposure adjustment in the imaging control unit 105 (step S204).

Figure 3:
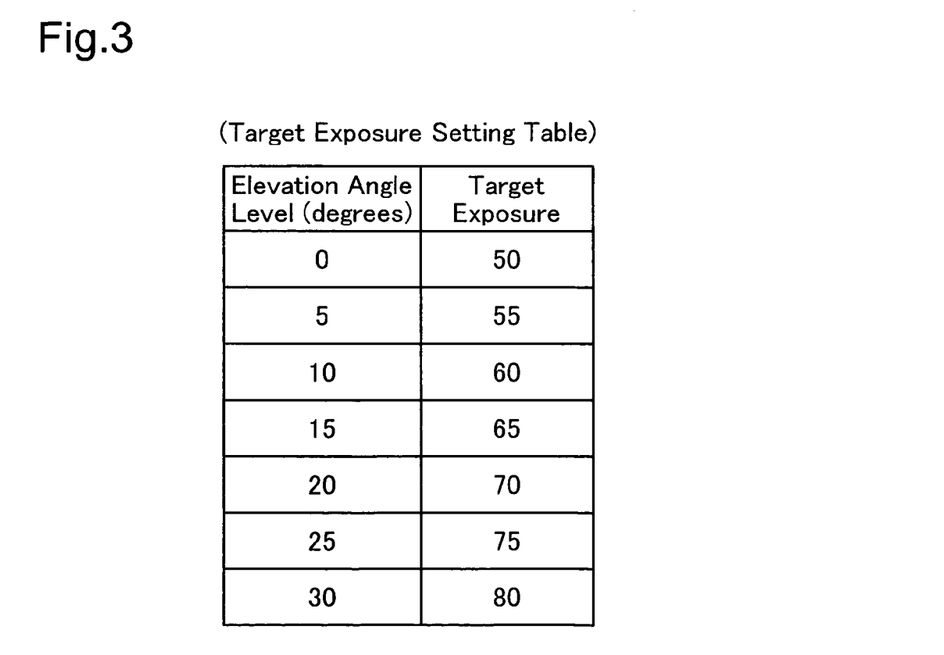
FIG. 3 shows a target exposure setting table stored in a target exposure setting table storage unit included in the projector of the embodiment.

FIG. 3 shows the target exposure setting table stored in the target exposure setting table storage unit 107.

As shown in FIG. 3, the target exposure setting table has values of the target exposure set corresponding to the elevation angle levels of 5-degree intervals. The terminology 'target exposure' is similar to the target exposure set in the conventional projector PJ and represents a target average luminance of all pixels included in a photographed image.

The target exposure setting table of FIG. 3 gives the greater target exposure corresponding to the greater elevation angle. The reason of such setting will be described later.

When the obtained elevation angle is 10 degrees, the CPU 120 reads the target exposure '60' corresponding to the elevation angle of 10 degrees from the target exposure setting table of FIG. 3 and sets the target exposure '60' as the target value of exposure adjustment in the imaging control unit 105.

The imaging control unit 105 adjusts the exposure to attain the target exposure set by the CPU 120 (step S206).

The imaging control unit 105 controls the imaging unit 104 to take an image of the screen including the adjustment pattern image projected on the screen. The screen image photographed by the imaging unit 104 is converted into image data (RGB data) by the image processing unit 103 and is stored into the image memory 106. The imaging control unit 105 reads the image data of the screen image from the image memory 106, computes the luminance of each pixel included in the image data according to a predetermined computational expression, and calculates an average luminance of all pixels in the image data.

The imaging control unit 105 controls the shutter speed, the gain, and the aperture set in the imaging unit 104 to adjust the exposure so that the calculated average luminance reaches the target exposure set by the CPU 120.

The imaging control unit 105 repeatedly carries out the photographing, the calculation of the average luminance and the control of the shutter speed etc. until the calculated average luminance reaches the target exposure set by the CPU 120.

The exposure adjustment makes the average luminance of all pixels equal to the target exposure. When the target exposure '60' is set in the imaging control unit 105, the exposure adjustment makes the average luminance of all pixels equal to 60.

Figure 4A:
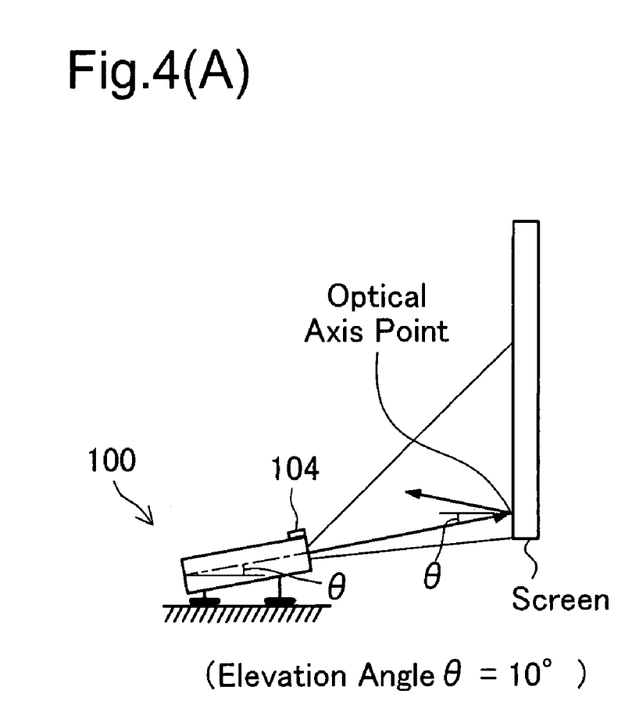
FIGS. 4(A) and 4(B) show an elevation projection state of the projector of the embodiment and a luminance distribution of an image photographed in the elevation projection state.
Figure 4B:
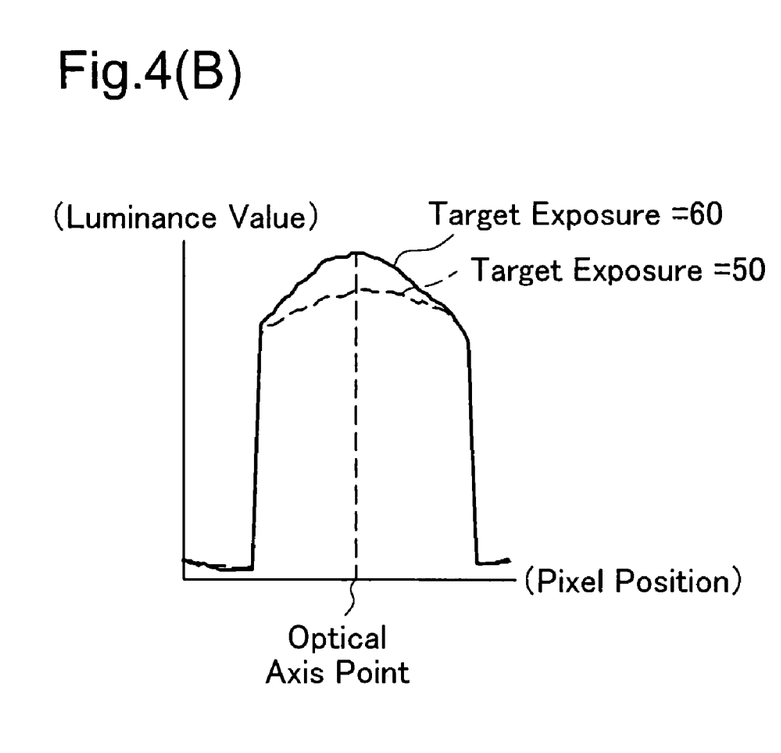

FIGS. 4(A) and 4(B) show an elevation projection state of the projector 100 of the embodiment and a luminance distribution of an image photographed in the elevation projection state.

FIG. 4(A) shows the elevation projection state that is identical with FIG. 7(A) and is thus not specifically described here. The graph of FIG. 4(b) shows a distribution of luminance values of respective pixels on a horizontal line including the optical axis point in an exposure-adjusted image photographed in the elevation projection state of FIG. 4(A). The abscissa and the ordinate of FIG. 4(B) are identical with those of FIG. 7(B) and are not specifically mentioned here.

In the graph of FIG. 4(B), the curve of thick solid line represents a luminance distribution for the target exposure of '60', and the curve of thin broken line represents a luminance distribution for the target exposure of '50'. The luminance distribution of the thin broken curve in FIG. 4(B) is identical with the luminance distribution shown in FIG. 7(B).

The luminance distribution of the thick solid curve has a peak luminance at a position corresponding to the optical axis point. The luminance distribution for the target exposure of '60' has a steeper peak and a more distinct peak position than the luminance distribution for the target exposure of '50', because of the following reason.

The exposure adjustment increases the luminance values of the respective pixels with the target exposure of '60' to 1.2 times on average the luminance values of the respective pixels with the target exposure of '50'. The difference in luminance value between adjacent pixels with the target exposure of '60' is accordingly 1.2 times on average the difference in luminance value between adjacent pixels with the target exposure of '50'.

The increased target exposure gives a distinct peak position as described above, but an excess increase of the target exposure may cause rather an indistinct peak position. It is assumed that the maximum target exposure of '80' shown in the table of FIG. 3 is set corresponding to all the elevation angle levels. In the case of a significantly small elevation angle, for example, under the condition of an elevation angle equal to 0 degree (that is, in the state of non-elevation projection), the luminance values of the respective pixels with the target exposure of '80' are 1.6 times on average the luminance values of the respective pixels with the target exposure of '50'. The luminance value at the position of the optical axis point accordingly reaches its maximum of '255', whereas the peripheral pixels may also have the maximum luminance value of '255'. This results in an indistinct peak position.

The target exposure setting table sets the greater target exposure corresponding to the larger elevation angle, because of the following reason.

The greater inclination of the projector to the screen represents the larger elevation angle and causes the specular reflection of the projection light irradiating the optical axis point to go father from the projector. Non-application of the technique of the invention makes the peak of the luminance distribution gentler and gives a more indistinct peak position.

Setting the greater target exposure corresponding to the larger elevation angle in the target exposure setting table as shown in FIG. 3 specifies the greater target exposure corresponding to the larger elevation angle and triggers exposure adjustment to attain the specified greater target exposure. Even in the inclined attitude of the projector to have the larger elevation angle, such exposure adjustment gives the greater difference in luminance value between adjacent pixels to make the peak of the luminance distribution steeper and to enable distinct identification of the peak position.

The target exposure to ensure a distinct identification of a peak position has experimentally or otherwise been determined in advance corresponding to each elevation angle level and set in the target exposure setting table.

The maximum luminance position identification process described above thus enables distinct identification of the position of maximum luminance in a photographed image.

The CPU 120 reads a program from the memory 121 and executes the program to specify adequate correction values for keystone correction. In response to an instruction from the CPU 120 according to this program, the imaging control unit 105 controls the imaging unit 104 to photograph a projected adjustment pattern image and stores the image data of the photographed adjustment pattern image into the image memory 106. The CPU 120 then reads the image data of the photographed adjustment pattern image from the image memory 106 and determines the position of maximum luminance according to the image data.

The maximum luminance position identification process ensures distinct identification of the position of maximum luminance in a photographed image as described above. The CPU 120 can thus determine the position of maximum luminance with high accuracy.

The variation in correction values for keystone correction against the position of maximum luminance is set in advance as a map and is stored in the memory 121. The CPU 120 reads the correction values for keystone correction corresponding to the determined position of maximum luminance from the map in the memory 121 and transmits the correction values for keystone correction to the image processing unit 103.

The image processing unit 103 adjusts the adjustment pattern image and makes the keystone correction with the correction values transmitted from the CPU 120. The image processing unit 103 also adjusts the digital video signals input from the A-D converter 102 and makes the keystone correction with the correction values transmitted from the CPU 120.

The keystone correction preliminarily corrects an object image to a trapezoidal shape to cancel out a trapezoidal distortion of a resulting projected image. The correction values represent the positions of apexes in the corrected trapezoidal shape.

The accurate determination of the position of maximum luminance enables the CPU 120 to specify the optimum correction values and transmit the optimum correction values to the image processing unit 103. The image processing unit 103 can thus make the adequate and accurate keystone correction.

A4. Effects of Embodiment

As described above, the target exposure setting table stored in the projector 100 sets the target exposure to ensure distinct identification of a peak position corresponding to each elevation angle. The CPU 120 refers to this target exposure setting table and sets the target value of exposure adjustment in the imaging control unit 105. The imaging control unit 105 adjusts the exposure to attain the set target exposure. The exposure adjustment gives a distinct peak position in a photographed image. This arrangement of the embodiment thus enables distinct identification of the position of maximum luminance and ensures adequate and accurate keystone correction.

The target exposure setting table has the greater target exposure corresponding to the larger elevation angle. In the inclined attitude of the projector 100 to have the larger elevation angle, the exposure adjustment is performed to give the higher average of the luminance values of the respective pixels.

Even when the larger elevation angle causes the specular reflection of the projection light irradiating the optical axis point to go father from the projector 100, the exposure adjustment of the embodiment gives the greater difference in luminance value between adjacent pixels included in a photographed image and thereby ensures distinct identification of the position of maximum luminance in the photographed image.

B. Modifications

The embodiment discussed above is to be considered in all aspects as illustrative and not restrictive. There may be many modifications, changes, and alterations without departing from the scope or spirit of the main characteristics of the present invention. Some examples of possible modification are given below.

B1. MODIFIED EXAMPLE 1

In the structure of the embodiment, the target exposure setting table is stored in the projector 100 before shipment. This is, however, not essential. In one possible modification, the user may directly connect a personal computer or an equivalent device to the projector 100 after shipment and store a target exposure setting table prepared by the user into the target exposure setting table storage unit 107.

Such modification enables the user to set the optimum target exposure for the actual working environment of the projector 100 (for example, for a projection object other than a screen).

B2. MODIFIED EXAMPLE 2

The target exposure setting table of the embodiment has the target exposures set corresponding to the elevation angle levels of 5-degree intervals as shown in FIG. 3. The interval of the elevation angle level in the target exposure setting table is, however, not restricted to the 5-degree interval but may be any larger or smaller interval than the 5-degree interval, for example, 4-degree interval or 6-degree interval.

The target exposure setting table of the embodiment may be replaced by a computational expression, which is experimentally or otherwise determined to compute the target exposure from the elevation angle as a parameter. In this modification, the CPU 120 computes the target exposure from the elevation angle obtained by the elevation angle acquisition unit 122 according to this computational expression and specifies the computed target exposure as the target value of exposure adjustment.

B3. MODIFIED EXAMPLE 3

The projector 100 of the embodiment executes the maximum luminance position identification process to make the adequate and accurate keystone correction. The technique of the invention is, however, not restricted to the keystone correction but is applicable to distinctly identify a peak position in a photographed image for zoom adjustment, focus adjustment, or any other image adjustment. Application of the technique of the invention ensures distinct identification of the peak position and thereby enables adequate and accurate image adjustment.

B4. MODIFIED EXAMPLE 4

The procedure of the embodiment distinctly identifies a peak position in a photographed image in the state of elevation projection in the vertical direction. The technique of the invention is also applicable to distinctly identify a peak position in a photographed image in the state of elevation projection in the horizontal direction, in addition to or in place of the elevation projection in the vertical direction.

A concrete procedure of detecting the gradient of the projector in the horizontal direction (the angle in the horizontal direction between the normal of the screen and optical axis) sets markers at four corners of a rectangular screen, performs zoom adjustment to make the two left apexes and the two right apexes of a projected image completely overlap the markers, and detect the gradient corresponding to the zoom value in the zoom adjustment. The procedure experimentally or otherwise specifies the optimum target exposure corresponding to each gradient level in the horizontal direction and prepares the target exposure setting table to set the target exposures corresponding to the gradient levels in the horizontal direction, in place of or in addition to the elevation angle levels.

B5. MODIFIED EXAMPLE 5

In the structure of the embodiment, the projection optical system 116 of the projector 100 has a lens shift. The technique of the invention is also applicable to a projector including a projection optical system without a lens shift to distinctly identify the position of maximum luminance.

B6. MODIFIED EXAMPLE 6

The projector 100 of the embodiment uses the all-white image as the adjustment pattern image. This is, however, not essential at all, and the adjustment pattern image may be an image of a preset tone pattern or an image of a selected symbol or a selected logo.

B7. MODIFIED EXAMPLE 7

The embodiment uses the luminance (Y) to express the brightness of an image. The luminance may be replaced by any of R, G, and B tone values or by an average of R, G, and B tone values.

B8. MODIFIED EXAMPLE 8

The technique of the invention is not restricted to the liquid crystal projectors like the projector 100 of the embodiment but is also applicable to DLP projectors (registered trademark).

Finally the present application claims the priority based on Japanese Patent Application No. 2005-28436 filed on Feb. 4, 2005, which is herein incorporated by reference.

What is claimed is:

1. A projector that projects an image on a projection object, the projector comprising:
    an imaging structure that photographs the image projected on the projection object to take a photographed image;
    an imaging control module that performs average luminosity adjustment in the imaging structure to attain a preset target average luminosity;
    a control module that sets the target average luminosity in the imaging control module;
    an acceleration sensor that obtains angle information representing an inclination of the projector to the projection object;
    a storage unit that stores a map representing a variation in target average luminosity against the angle information, wherein the map sets a greater target average luminosity corresponding to a piece of the angle information representing a greater inclination;
    an analyzer module that analyzes the photographed image taken by the imaging structure and obtains positional information representing a peak position or a maximum brightness position in the photographed image; and
    an image processing module that adjusts the projected image, based on the positional information obtained by the analyzer module,
    wherein the control module controls the acceleration sensor to obtain the angle information, refers to the map stored in the storage unit to specify the target average luminosity corresponding to the obtained angle information, and sets the specified target average luminosity in the imaging control module.

2. The projector in accordance with claim 1, wherein the image processing module adjusts the projected image to correct a distortion of the projected image caused by the inclination of the projector to the projection object.

3. An average luminosity adjustment method adopted in a projector, which is equipped with an imaging structure of photographing an image projected on a projection object, to perform average luminosity adjustment in the imaging structure, the average luminosity adjustment method comprising the steps of:
    (a) obtaining angle information representing an inclination of the projector to the projection object;
    (b) specifying a target average luminosity corresponding to the obtained angle information based on a map which represents a variation in the target average luminosity against the angle information and sets a greater target average luminosity corresponding to a piece of the angle information representing a greater inclination;
    (c) performing average luminosity adjustment in the imaging structure to attain the specified target average luminosity;
    (d) analyzing the photographed image taken by the imaging structure and obtains positional information representing a peak position or a maximum brightness position in the photographed image; and
    (e) adjusting the image projected, based on the positional information obtained by the analyzer module.

* * * * *

UNITED STATES PATENT AND TRADEMARK OFFICE
CERTIFICATE OF CORRECTION

PATENT NO.        : 7,648,246 B2
APPLICATION NO. : 11/345389
DATED             : January 19, 2010
INVENTOR(S)       : Noriaki Miyasaka It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1023 days.

Signed and Sealed this

Twenty-eighth Day of December, 2010

David J. Kappos
*Director of the United States Patent and Trademark Office*